(12) United States Patent
Lee

(10) Patent No.: US 9,038,452 B2
(45) Date of Patent: May 26, 2015

(54) SYSTEMS AND METHODS FOR MEASURING FORCES ACTING ON A DOWNHOLE TOOL

(75) Inventor: Che-Keung Lawrence Lee, Manvel, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 260 days.

(21) Appl. No.: 13/546,725

(22) Filed: Jul. 11, 2012

(65) Prior Publication Data

US 2014/0013837 A1    Jan. 16, 2014

(51) Int. Cl.
*E21B 47/00* (2012.01)
*E21B 47/01* (2012.01)
*G01L 5/00* (2006.01)
*G01L 5/16* (2006.01)

(52) U.S. Cl.
CPC ............. *E21B 47/0006* (2013.01); *E21B 47/01* (2013.01); *G01L 5/0004* (2013.01); *G01L 5/16* (2013.01)

(58) Field of Classification Search
CPC ..... G01L 5/0004; G01L 5/16; E21B 47/0006; E21B 47/01
See application file for complete search history.

(56) References Cited

U.S. PATENT DOCUMENTS

| | | | | |
|---|---|---|---|---|
| 4,805,449 A | * | 2/1989 | Das | 73/152.48 |
| 2009/0071645 A1 | * | 3/2009 | Kenison et al. | 166/250.01 |

* cited by examiner

*Primary Examiner* — Paul West

(57) ABSTRACT

An apparatus for measuring forces acting on a downhole tool is provided. The apparatus can include an annular body having an axial bore formed therethrough. A first fluid can be disposed within the bore. An annular sleeve can be disposed proximate an inner surface of the body. An annular chamber can be formed between the body and the sleeve, and a second fluid can be disposed within the chamber. A sensor can be coupled to the sleeve to measure a strain placed on the sleeve by a pressure differential between the first and second fluids. A pressure of the first fluid in the bore can be determined from the strain.

20 Claims, 1 Drawing Sheet

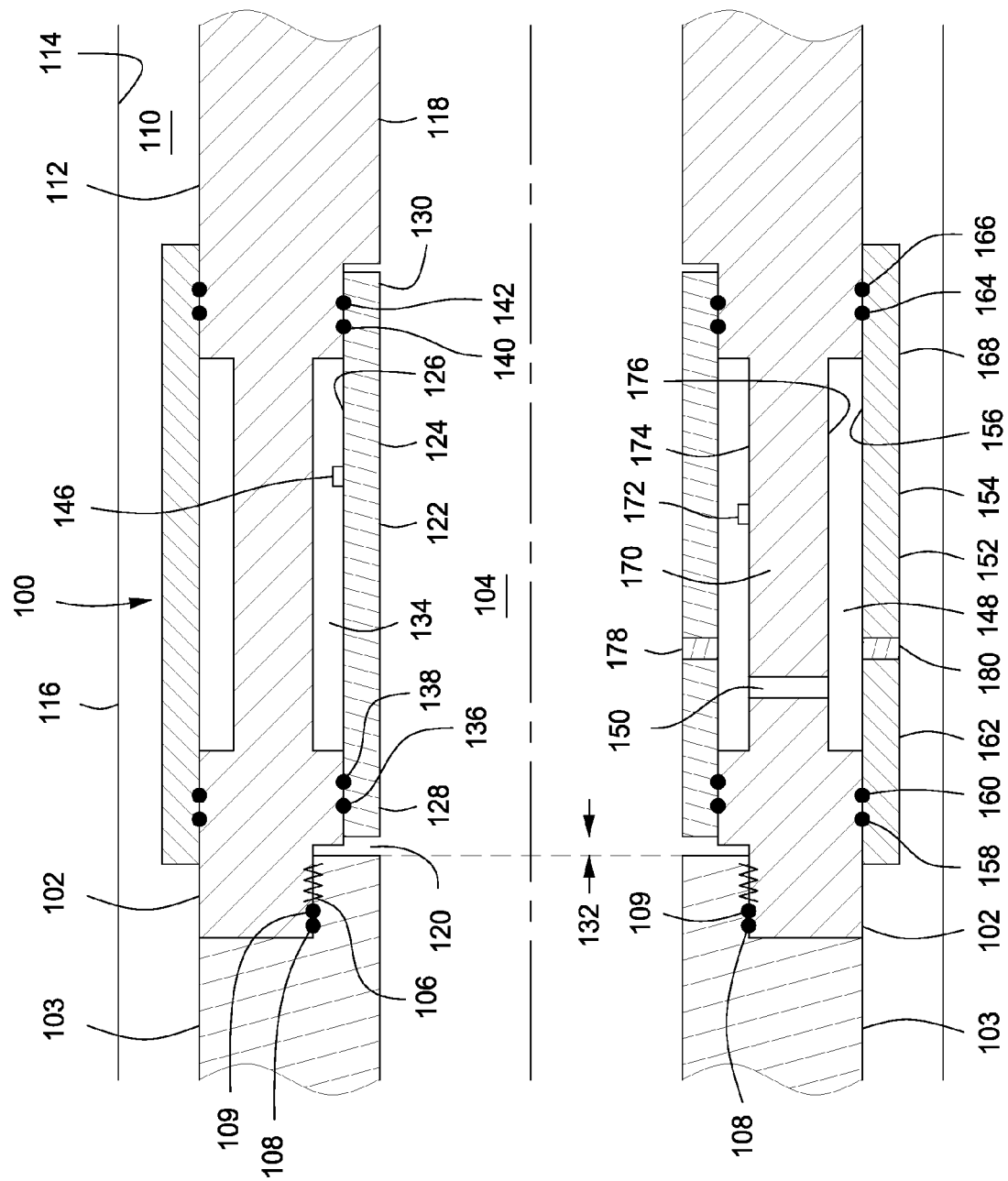

SYSTEMS AND METHODS FOR MEASURING FORCES ACTING ON A DOWNHOLE TOOL

BACKGROUND

Embodiments described herein generally relate to systems and methods for measuring forces acting on a downhole tool.

The pressure of a fluid within the bore of a downhole tool is oftentimes determined by drilling or otherwise forming a radial penetration in the tool and inserting a pressure gauge into the bore via the penetration. When a penetration is neither acceptable nor desirable, the bore pressure is determined by measuring the deformation of the tool. For example, when the bore pressure is greater than the pressure outside of the tool, the tool tends to swell or expand radially outward. This causes the length of the tool to decrease (as a result of Poisson's effect). When the bore pressure is less than the ambient pressure, however, the tool tends to compress or contract radially inward. This causes the length of the tool to increase (as a result of Poisson's effect). This method for measuring the fluid pressure within the bore of the tool is more accurate when there is no axial load on the tool.

Axial loads on the tool, however, can affect the measurement of the fluid pressure within the bore. For example, the length of the tool increases when the tool is under a tension load. This causes the tool to compress or contract radially inward. Conversely, the length of the tool decreases when the tool is under a compression load. This causes the tool to swell or expand radially outward. Thus, an axial load on the tool will affect or interfere with the measurement of the fluid pressure in the bore, and vice versa. This interference is known as "cross-talk."

What is needed, therefore, is an improved system and method for measuring the bore pressure and the axial load placed on a downhole tool.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An apparatus for measuring forces acting on a downhole tool is provided. The apparatus can include an annular body having an axial bore formed therethrough. A first fluid can be disposed within the bore. An annular sleeve can be disposed proximate an inner surface of the body. An annular chamber can be formed between the body and the sleeve, and a second fluid can be disposed within the chamber. A sensor can be coupled to the sleeve to measure a strain placed on the sleeve by a pressure differential between the first and second fluids. A pressure of the first fluid in the bore can be determined from the strain.

In another embodiment, the apparatus can include an annular body having an axial bore formed therethrough. A first fluid can be disposed within the bore. A sleeve can be disposed proximate an inner surface of the body. A first chamber can be formed between the body and the sleeve, and a second fluid can be disposed within the first chamber. A cover can be disposed proximate an outer surface of the body. A second chamber can be formed between the body and the cover, and a third fluid can be disposed within the second chamber. A pressure differential between the second and third fluids can be less than 1000 kPa. A first sensor can be coupled to a load bearing portion of the body between the first and second chambers to measure a strain placed on the body by an axial load on the body. The axial load can be determined from the strain.

A method for measuring forces acting on a downhole tool is also provided. The method can include running the downhole tool into a wellbore. The downhole tool can include an annular body having an axial bore formed therethrough. A first fluid can be disposed within the bore. A sleeve can be disposed proximate an inner surface of the body. A first chamber can be formed between the body and the sleeve, and a second fluid can be disposed within the first chamber. A cover can be disposed proximate an outer surface of the body. A second chamber can be formed between the body and the cover, and a third fluid can be disposed within the second chamber. A pressure differential between the second and third fluids can be less than 1000 kPa.

BRIEF DESCRIPTION OF THE DRAWINGS

So that the recited features can be understood in detail, a more particular description, briefly summarized above, can be had by reference to one or more embodiments, some of which are illustrated in the appended drawings. It is to be noted, however, that the appended drawings illustrate only exemplary embodiments and are therefore not to be considered limiting of its scope, for the disclosure can admit to other equally effective embodiments.

FIG. 1 depicts a sectional view of an illustrative apparatus for measuring forces on a downhole tool, according to one or more embodiments described herein.

DETAILED DESCRIPTION

FIG. 1 depicts a sectional view of an illustrative apparatus 100 for measuring forces on a downhole tool, according to one or more embodiments. For purposes of clarity, the sectional view is shown through a plane that extends axially through the apparatus 100. The apparatus 100 can be integrated with or coupled to a downhole tool that is subjected to an axial and/or pressure force. Illustrative downhole tools can be or include work strings, liners, casings, plugs, packers, and the like.

The downhole tool can include a mandrel or body that is cut or divided into a first body 102 and a second body 103 for ease of assembly. The various elements of the apparatus 100 can be formed or disposed on, in, and/or around the first body 102 (as shown), the second body 103, or both, and the first and second bodies 102, 103 can then be threadably engaged back together at point 106. In another embodiment, the apparatus 100 can include its own mandrel or body 102 that is coupled to or threadably engaged with the body 103 of the downhole tool at point 106. For purposes of simplicity, the remainder of the description will refer to the bodies as first body 102 and second body 103.

The first and second bodies 102, 103 can be annular and have a bore 104 formed axially therethrough. One or more annular seals (two are shown 108, 109) can be disposed between the first and second bodies 102, 103. The seals 108, 109 can prevent fluid disposed within the bore 104 from leaking into an annulus 110 formed between an outer surface 112 of the bodies 102, 103 and an inner surface 114 of a pipe, casing, or wellbore 116, or vice versa. In at least one embodiment, the seals 108, 109 can be elastomeric O-rings.

A portion of the first body 102 proximate an inner surface 118 thereof can be removed to form an annular recess 120. An annular sleeve 122 can be disposed at least partially within the recess 120. In at least one embodiment, an inner surface 124 of the sleeve 122 can have the same (or substantially the same) diameter as the inner surface 118 of the first and/or second bodies 102, 103 such that the sleeve 122 does not project radially-inward into the bore 104 and reduce the cross-sectional area thereof. However, in at least one embodiment, the recess 120 can be omitted (not shown), and an outer surface 126 of the sleeve 122 can have the same (or substantially the same) diameter as the inner surface 118 of the first and/or second body 102, 103. The terms "inner" and "outer"; "inward" and "outward"; "up" and "down"; "upper" and "lower"; "upwardly" and "downwardly"; "upstream" and "downstream"; "above" and "below"; and other like terms as used herein refer to relative positions to one another and are not intended to denote a particular direction or spatial orientation.

The inner diameter of the first body 102, second body 103, and/or the sleeve 122 can range from a low of about 5 cm, about 10 cm, about 15 cm, about 20 cm, or about 25 cm to a high of about 30 cm, about 35 cm, about 40 cm, about 45 cm, about 50 cm, or more. The outer diameter of the first body 102 and/or the second body 103 can range from a low of about 10 cm, about 15 cm, about 20 cm, about 25 cm, or about 30 cm to a high of about 35 cm, about 40 cm, about 50 cm, about 60 cm, about 70 cm, or more.

The axial length of the sleeve 122 is less than the axial length of the recess 120 such that at least one axial end 128, 130 of the sleeve 122 is not in contact with the first and/or second body 102, 103. In other words, an axial gap 132 can be disposed or formed adjacent the first end 128 of the sleeve 122 (as shown) and/or the second end 130 of the sleeve 122. For example, the axial gap 132 can be formed between the first end 128 of the sleeve 122 and the first body 102, the first end 128 of the sleeve 122 and the second body 103 (as shown), and/or the second end 130 of the sleeve 122 and the first body 102. The length of the axial gap 132 can range from a low of about 0.5 mm, about 1 mm, about 2 mm, about 4 mm, or about 6 mm to a high of about 1 cm, about 2 cm, about 3 cm, about 4 cm, about 5 cm, or more. The axial gap 132 can enable the sleeve 122 to expand axially without constraint, as explained in more detail below.

A first or inner annular chamber 134 can be disposed radially between the sleeve 122 and the first body 102. The first chamber 134 can be a vacuum chamber or have a fluid disposed therein. In at least one embodiment, the fluid can be a dielectric oil or inert gas such as nitrogen. One or more seals (two are shown 136, 138) can be disposed between the first end 128 of the sleeve 122 and the first body 102. Similarly, one or more seals (two are shown 140, 142) can be disposed between the second end 130 of the sleeve 122 and the first body 102. The seals 136, 138, 140, 142 can be elastomeric O-rings. The sleeve 122, and the seals 136, 138, 140, 142 can prevent the fluid in the bore 104 from leaking into the first chamber 134, or vice versa, thus maintaining the pressure of the fluid within the first chamber 134.

The fluid within the first chamber 134 can have any pressure. For example, the pressure of the fluid within the first chamber 134 can range from a low of about 0 kPa (e.g., vacuum), about 10 kPa, about 25 kPa, about 50 kPa, about 100 kPa, or about 500 kPa to a high of about 1 MPa, about 2 MPa, about 4 MPa, about 6 MPa, about 8 MPa, or more.

The pressure of the fluid within the bore 104 can range from a low of about 1 MPa, about 5 MPa, about 10 MPa, about 25 MPa, or about 50 MPa to a high of about 75 MPa, about 100 MPa, about 125 MPa, about 150 MPa, about 175 MPa, about 200 MPa, or more. The relative pressure differential between the fluid within the bore 104 and the fluid within the first chamber 134 can place a strain on the sleeve 122 causing it to expand and/or contract radially, thereby causing it to contract and/or expand axially due to the Poisson's effect. For example, as the pressure of the fluid within the bore 104 increases, the sleeve 122 can expand radially into the cavity 134, thereby causing it to contract axially due to Poisson's effect; however, as the pressure of the fluid within the bore 104 decreases, the sleeve 122 can contract radially, thereby causing it to expand axially due to Poisson's effect. The sleeve 122 can be made of any material capable of expanding and contracting in response to the pressure differential. The sleeve 122 can be made of a material with a thickness that is sufficiently strong not to permanently deform or burst under the differential pressure. Suitable materials can include aluminum, 8360 alloy steel, 17-4 PH, INCONEL 718®, or the like.

One or more first sensors or pressure sensors (one is shown 146) can be disposed on or coupled to the sleeve 122. The first sensor 146 can be coupled to the inner surface 124 of the sleeve 122, the outer surface 126 of the sleeve 122, or both. The pressure differential can cause the sleeve 122 to deform placing a circumferential and axial strain on the sleeve 122, and the first sensor 146 can measure the strain. In at least one embodiment, the first sensor 146 can include two sensors: one to measure the circumferential strain on the sleeve 122, and the other to measure the axial strain on the sleeve 122. The first sensor 146 can be a strain gauge sensor (e.g., foil strain gauge), an optical sensor (e.g., fiber optic), a capacitive sensor, an electromagnetic sensor, a piezoelectric sensor, a potentiometric sensor, or the like. The terms "couple," "coupled," "connect," "connection," "connected," "in connection with," and "connecting" refer to "in direct connection with" or "in connection with via another element or member."

The measured strain values can be converted into stress values using Hooke's Law. The stress values can then be used to determine the pressure of the fluid within the bore 104 using Lame's formula. If the pressure of the fluid within the first chamber 134 is 0 kPa (e.g., vacuum), then the absolute pressure of the fluid within the bore 104 can be determined; however, if the pressure of the fluid within the first chamber 134 is greater than 0 kPa, then the relative pressure of the fluid within the bore 104 can be determined. The first sensor 146 enables the pressure of the fluid in the bore 104 to be measured without penetration into the bore 104, i.e., without a radial hole formed through the body 102.

The sleeve 122 can expand axially (into the gap 132) and contract radially (into the bore 104) in response to the pressure differential. The ability to freely expand and contract enables the sleeve 122 to be unaffected by the axial forces or loads placed on the bodies 102, 103. This can allow the first sensor 146 to measure the strain on the sleeve 122, and thereby determine the pressure of the fluid within the bore 104, even when the body 102, 103 is subject to an axial load. As such, the ability of the sleeve 122 to expand and contract can reduce "cross-talk" caused by the axial load.

A second or outer annular chamber 148 can be disposed radially-outward from the first chamber 134. The second chamber 148 can have a fluid disposed therein. In at least one embodiment, the fluid can be a dielectric oil or inert gas such as nitrogen. The pressure of the fluid in the second chamber 148 can be the same (or substantially the same) as the pressure of the fluid in the first chamber 134. For example, the pressure differential between the fluid in the first and second chambers 134, 148 can be less than about 5,000 kPa, less than about 1,000 kPa, less than about 500 kPa, less than about 250 kPa, less than about 100 kPa, less than about 50 kPa, less than about 25 kPa, less than about 10 kPa, less than about 5 kPa, or about 0 kPa. One or more radial openings, conduits, or paths (one is shown 150) can be disposed through the first body 102 to place the first chamber 134 in fluid communication with the second chamber 148, thereby enabling the pressure of the first and second chambers 134, 148 to be the same. The opening, conduit, or path 150 can be a straight hole, a complex conduit, a labyrinth path, a diaphragm or bellows, or the like to allow pressure equalization between the chambers 134, 148.

A cover 152 can be disposed radially-outward from the second chamber 148. The cover 152 can be coupled to the first body 102, or the cover 152 can be integral with the first body 102 (rather than a separate component). An inner surface 156 of the cover 152 can have the same (or substantially the same) diameter as the outer surface 112 of the first and/or second body 102, 103. The cover 152 can be any shape or size such that it is capable of sealing the fluid within the second chamber 148. As such, the cover 152 can be the same or different geometrical form than the sleeve 122.

One or more seals (two are shown 158, 160) can be disposed between a first end 162 of the cover 152 and the first body 102. Similarly, one or more seals (two are shown 164, 166) can be disposed between a second end 168 of the cover 152 and the first body 102. The seals 158, 160, 164, 166 can be elastomeric O-rings. The cover 152 and the seals 158, 160, 164, 166 can prevent the fluid in the annulus 110 from leaking into the second chamber 148, or vice versa, thus maintaining the pressure of the fluid within the second chamber 148.

An axial load bearing portion 170 of the first body 102 can be disposed between the first and second chambers 134, 148. An axial, bending, and/or torque force or load on the downhole tool 100 can place a strain on the load bearing portion 170, causing it to expand and/or contract axially and/or radially. For example, a tension load on the downhole tool 100 can cause the load bearing portion 170 to expand axially and contract radially, while a compression load on the downhole tool 100 can cause the load bearing portion 170 to contract axially and expand radially. When subjected to a compression load, the gap 132 can prevent the axial compression from being transferred to the sleeve 122. Thus, the measurements of the first sensor 146 are not affected by the axial compression load acting on the load bearing portion 170. The tension load on the downhole tool 100 can range from a low of about 1,000 kg, about 10,000 kg, or about 100,000 kg to a high of about 1,000,000 kg, about 5,000,000 kg, about 10,000,000 kg, or more. The compression load on the downhole tool 100 can range from a low of about 100 kg, about 1,000 kg, or about 10,000 kg to a high of about 50,000 kg, about 100,000 kg, about 200,000 kg, or more.

One or more second sensors or load sensors (one is shown 172) can be disposed on or coupled to the load bearing portion 170 to measure the strain caused by the load on the downhole tool 100. In at least one embodiment, the second sensor 172 can include two sensors: one to measure the circumferential strain on the load bearing portion 170, and the other to measure the axial strain on the load bearing portion 170. The second sensor 172 can be coupled to an inner surface 174 of the load bearing portion 170 (i.e., in fluid communication with the first chamber 134, as shown), an outer surface 176 of the load bearing portion 170 (i.e., in fluid communication with the second chamber 148), split between the two or on both. From the measured strain, the second sensor 172 can determine the axial load on the load bearing portion 170, which can be equivalent to the load on the downhole tool 100. The second sensor 172 can be a strain gauge sensor (e.g., foil strain gauge), an optical sensor (e.g., fiber optic), a capacitive sensor, an electromagnetic sensor, a piezoelectric sensor, a potentiometric sensor, or the like.

As the pressure of the fluid proximate the inner surface 174 and the outer surface 176 of the load bearing portion 170 is the same (or substantially the same), the second sensor 172 can measure the strain on the load bearing portion 170, and thereby determine the axial load on the load bearing portion 170, irrespective of the pressure of the fluid in the bore 104. As such, "cross-talk" from the pressure of the fluid in the bore 104 can be reduced.

In operation, the sleeve 122 can be placed in the recess 120 proximate the inner surface 118 of the first body 102 to seal the fluid within the first chamber 134. A device, such as a pump or vacuum, can increase or decrease the pressure of the fluid in the first chamber 134 via an opening in the sleeve 122. Once the desired pressure is attained, the opening can be plugged or otherwise sealed off with a stopper 178. The first body 102 can then be threadably engaged with the second body 103 at point 106.

The cover 152 can be placed proximate the outer surface 112 of the first body 102. The pump or vacuum can increase or decrease the pressure of the fluid in the second chamber 148 via an opening in the cover 152. Once the desired pressure is attained, the opening can be plugged or otherwise sealed off with a stopper 180. When the opening, conduit, or path 150 is disposed through the load bearing portion 170 of the first body 102, however, only a single opening (in either the sleeve 122 or the cover 152) is needed to attain the desired pressure in both chambers 134, 148.

Once the sleeve 122 and the cover 152 are in place, and the fluid within the chambers 134, 148 is set to the desired pressure, the downhole tool 100 can be run into the wellbore 116. When the downhole tool 100 is located at the desired position within the wellbore 116, the pressure of the fluid within the bore 104 of the downhole tool 100 can be increased, for example, during fracturing or "fracking" operations. The pressure of the fluid within the bore 104 can also increase as the downhole tool 100 is lowered into a subsea riser due to hydrostatic pressure. The pressure differential between the fluid within the bore 104 and the fluid in the first chamber 134 can place a strain on the sleeve 122, causing the sleeve 122 to expand and/or contract axially and/or radially. The first sensor 146 can measure the strain on the sleeve 122 caused by the pressure differential, and thereby determine the pressure of the fluid in the bore 104. As the sleeve 122 is able to expand and contract irrespective of the axial load on the downhole tool 100, the pressure measurements of the first sensor 146 can be unaffected by the axial load on the downhole tool 100.

Instead of, or in addition to, increasing the pressure of the fluid within the bore 104, an axial load can be placed on the downhole tool 100, e.g., a tension load or a compression load. The second sensor 172 can measure the strain placed on the load bearing portion 170 of the downhole tool 100, and thereby determine the axial load on the downhole tool 100. As the pressure is the same (or substantially the same) on both sides of the load bearing portion 170 of the downhole tool 100, the load measurement of the second sensor 172 can be unaffected by the pressure of the fluid within the bore 104.

The measurements taken by the first and/or second sensors 146, 172 can be transmitted to other locations via various data transmission methods. For example, the measurements can be transmitted to the surface wirelessly, via communication cables including fiber optic cables, acoustically, via one or more fluid pulses, or the like. In another embodiment, the measurements taken by the first and/or second sensors 146, 172 can be stored and retrieved when the downhole tool 100 is pulled out of the wellbore 116.

Although only a few example embodiments have been described in detail above, those skilled in the art will readily appreciate that many modifications are possible in the example embodiments without materially departing from "Systems and Methods for Measuring Forces Acting on a Downhole Tool." Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An apparatus for measuring forces acting on a downhole tool, comprising:
    an annular body having an axial bore formed therethrough, wherein a first fluid is disposed within the bore;
    an annular sleeve disposed proximate an inner surface of the body; an annular chamber formed between the body and the sleeve;
    a second fluid disposed within the chamber;
    a first sensor coupled to the sleeve to measure a strain placed on the sleeve by a pressure differential between the first and second fluids, wherein a pressure of the first fluid in the bore is determined from the strain;
    a cover disposed proximate an outer surface of the body, wherein a second chamber is formed between the body and the cover, wherein a third fluid is disposed with the second chamber; and
    a second sensor coupled to the sleeve to measure a strain placed on the sleeve by a pressure differential between the first fluid and the second fluid.

2. The apparatus of claim 1, wherein the sleeve is disposed within an annular recess in the body such that an inner surface of the sleeve has substantially the same diameter as the inner surface of the body.

3. The apparatus of claim 1, wherein a gap is disposed adjacent an end of the sleeve such that the sleeve is free to expand axially in response to the pressure differential.

4. The apparatus of claim 3, wherein the gap is formed between the end of the sleeve and the body.

5. The apparatus of claim 4, wherein a length of the gap is between 0.5 mm and 5 cm.

6. The apparatus of claim 1, wherein the second sensor is coupled to an outer surface of the sleeve.

7. The apparatus of claim 1, wherein the second fluid has a pressure less than 10 MPa.

8. The apparatus of claim 1, wherein the second sensor is selected from the group consisting of a strain gauge sensor, an optical sensor, a capacitive sensor, an electromagnetic sensor, a piezoelectric sensor, and a potentiometric sensor.

9. The apparatus of claim 1, wherein the first sensor is coupled to an inner surface of the body.

10. The apparatus of claim 1, wherein the first sensor is coupled to an inner surface of the body, an outer surface of the body, or both.

11. An apparatus for measuring forces acting on a downhole tool, comprising:
    an annular body having an axial bore formed therethrough, wherein a first fluid is disposed within the bore;
    a sleeve disposed proximate an inner surface of the body, wherein a first chamber is formed between the body and the sleeve, and wherein a second fluid is disposed within the first chamber;
    a cover disposed proximate an outer surface of the body, wherein a second chamber is formed between the body and the cover, wherein a third fluid is disposed within the second chamber, and wherein a pressure differential between the second and third fluids is less than 1000 kPa;
    a first sensor coupled to a load bearing portion of the body between the first and second chambers to measure a strain placed on the body by an axial load on the body, wherein the axial load is determined from the strain; and
    a hole formed through the load bearing portion of the body to place the first chamber in fluid communication with the second chamber to enable the pressures of the second and third fluids to equalize.

12. The apparatus of claim 11, wherein the second fluid has the same pressure as the third fluid.

13. The apparatus of claim 11, wherein the first sensor is coupled to an inner surface of the body.

14. The apparatus of claim 11, wherein the first sensor is coupled to an inner surface of the body, an outer surface of the body, or both.

15. The apparatus of claim 11, wherein an inner surface of the cover is aligned with an outer surface of the body.

16. The apparatus of claim 11, wherein the first sensor is selected from the group consisting of a strain gauge sensor, an optical sensor, a capacitive sensor, an electromagnetic sensor, a piezoelectric sensor, and a potentiometric sensor.

17. The apparatus of claim 11, further comprising a second sensor coupled to the sleeve to measure a strain placed on the sleeve by a pressure differential between the first fluid and the second fluid.

18. A method for measuring forces acting on a downhole tool, comprising:
    running the downhole tool into a wellbore, the downhole tool comprising: an annular body having an axial bore formed therethrough, wherein a first fluid is disposed within the bore;
    a sleeve disposed proximate an inner surface of the body, wherein a first chamber is formed between the body and the sleeve, and wherein a second fluid is disposed within the first chamber;
    a cover disposed proximate an outer surface of the body, wherein a second chamber is formed between the body and the cover, wherein a third fluid is disposed within the second chamber, and wherein a pressure differential between the second and third fluids is less than 1000 kPa; and
    measuring a strain on the sleeve with a sensor coupled thereto, wherein the strain is caused by a pressure differential between the first and second fluids, and wherein a pressure of the first fluid is determined from the strain.

19. The method of claim 18, further comprising expanding the sleeve in an axial direction in response to the pressure differential between the first and second fluids.

20. The method of claim 18, further comprising measuring a strain on a load bearing portion of the body with a sensor coupled thereto, wherein the load bearing portion of the body is disposed between the first and second chambers, and wherein an axial load on the body is determined from the strain.

* * * * *